United States Patent
Narahara et al.

(10) Patent No.: US 10,508,613 B2
(45) Date of Patent: Dec. 17, 2019

(54) DIRECT INJECTION ENGINE AND CONTROL METHOD THEREOF

(71) Applicant: MAZDA MOTOR CORPORATION, Hiroshima (JP)

(72) Inventors: Kazuaki Narahara, Aki-gun (JP); Masahiko Fujimoto, Hiroshima (JP); Yoshihisa Nou, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 155 days.

(21) Appl. No.: 15/686,426

(22) Filed: Aug. 25, 2017

(65) Prior Publication Data

US 2018/0066599 A1   Mar. 8, 2018

(30) Foreign Application Priority Data

Sep. 5, 2016   (JP) .................................. 2016-172755

(51) Int. Cl.
*F02D 41/30*   (2006.01)
*F02D 41/00*   (2006.01)
(Continued)

(52) U.S. Cl.
CPC ..... *F02D 41/3094* (2013.01); *F02D 41/0025* (2013.01); *F02D 41/345* (2013.01); *F02D 2041/389* (2013.01)

(58) Field of Classification Search
CPC ...... F02B 43/10; F02B 47/02; F02D 13/0265; F02D 2041/389; F02D 41/0025;
(Continued)

(56) References Cited

U.S. PATENT DOCUMENTS

| 8,417,437 B2 * | 4/2013 | Yamashita | .......... F02D 13/0207 |
| | | | 123/299 |
| 2004/0003781 A1 * | 1/2004 | Yuki | ....................... F02B 47/02 |
| | | | 123/25 C |

(Continued)

FOREIGN PATENT DOCUMENTS

| JP | S60-184923 A | 9/1985 |
| JP | 2004-068776 A | 3/2004 |

(Continued)

OTHER PUBLICATIONS

JP Office Action dated Mar. 6, 2018, from corresponding JP Appl No. 2016-172755, 2 pp.

*Primary Examiner* — Carl C Staubach
(74) *Attorney, Agent, or Firm* — Studebaker & Brackett PC

(57) ABSTRACT

A direct injection engine includes a fuel injection valve configured to inject fuel into a cylinder, a water injection valve configured to inject water into the cylinder, and a valve variable mechanism configured to change an operation timing of each of an intake valve and an exhaust valve. During an operation in a low load range, a negative overlap period when both of the intake valve and the exhaust valve are closed across an exhaust top dead center is formed by the valve variable mechanism, and fuel is injected from the fuel injection valve and water is injected from the water injection valve respectively during the negative overlap period. This causes a steam reforming reaction such that at least a part of injected fuel and injected water turns to hydrogen and carbon monoxide within the cylinder during the negative overlap period.

10 Claims, 8 Drawing Sheets

(51) Int. Cl.
*F02D 41/34* (2006.01)
*F02D 41/38* (2006.01)

(58) Field of Classification Search
CPC .. F02D 41/3094; F02D 41/345; F02D 41/401; F02M 25/03; Y02T 10/18; Y02T 10/44
See application file for complete search history.

(56) References Cited

U.S. PATENT DOCUMENTS

| | | | |
|---|---|---|---|
| 2007/0215095 A1 | 9/2007 | Kakuya et al. | |
| 2009/0093950 A1* | 4/2009 | Yi | F02D 13/0265 701/105 |
| 2010/0161203 A1 | 6/2010 | Shigenaga et al. | |
| 2010/0183993 A1* | 7/2010 | McAlister | F02M 57/005 431/254 |
| 2011/0180035 A1* | 7/2011 | Durrett | F02B 17/005 123/295 |
| 2012/0037098 A1* | 2/2012 | Wey | F02B 51/06 123/3 |
| 2014/0026852 A1* | 1/2014 | Jiang | F02D 41/30 123/344 |
| 2014/0230784 A1* | 8/2014 | Oudart | F02D 41/3041 123/344 |
| 2014/0283800 A1* | 9/2014 | Hellstrom | F02D 41/0062 123/568.14 |
| 2015/0114340 A1* | 4/2015 | Saito | F02D 37/00 123/294 |
| 2016/0069320 A1* | 3/2016 | Idicheria | F02D 13/0261 123/298 |
| 2017/0284315 A1* | 10/2017 | Asai | F02M 33/00 |
| 2018/0058383 A1* | 3/2018 | Narahara | F02B 9/02 |

FOREIGN PATENT DOCUMENTS

| | | |
|---|---|---|
| JP | 2007-247479 A | 9/2007 |
| JP | 2009-168039 A | 7/2009 |
| JP | 2010-025031 A | 2/2010 |
| JP | 2010-150952 A | 7/2010 |
| JP | 2015-86790 A | 5/2015 |

* cited by examiner

DIRECT INJECTION ENGINE AND CONTROL METHOD THEREOF

TECHNICAL FIELD

The present invention relates to an engine configured to combust fuel containing gasoline after reforming the fuel.

BACKGROUND ART

As an engine configured to combust reformed fuel as described above, there is known an engine disclosed in Japanese Unexamined Patent Publication No. 2010-25031. The engine disclosed in Japanese Unexamined Patent Publication No. 2010-25031 includes a cylinder, an intake passage and an exhaust passage connected to the cylinder, an injector configured to inject fuel to a downstream end (an intake port) of the intake passage, a reforming chamber formed at a midway of the exhaust passage, a reforming catalyst disposed in the reforming chamber, an exhaust gas inlet passage for connecting between the reforming chamber and the exhaust passage on the upstream side of the reforming chamber, a reformed gas inlet pipe for connecting between the reforming chamber and the intake passage, and a water injection nozzle and a fuel supply device mounted to the exhaust gas inlet passage. Water injected from the water injection nozzle and fuel supplied from the fuel supply device react each other while undergoing an endothermic reaction during passing through the reforming chamber (the reforming catalyst), and turn to hydrogen and carbon monoxide (a steam reforming reaction). Reformed fuel containing hydrogen and carbon monoxide, in other words, reformed gas is introduced into the intake passage through the reformed gas inlet pipe, and is introduced into the cylinder (the combustion chamber) after being mixed with fuel injected from the injector.

Reformed gas containing hydrogen and carbon monoxide has a high lean limit, as compared with fuel before reforming, and a calorific value of reformed gas is high. Therefore, an effect of improving fuel economy of an engine is expected by introducing fuel containing reformed gas into a cylinder for combustion.

In the engine disclosed in Japanese Unexamined Patent Publication No. 2010-25031, however, fuel is reformed in the reforming chamber formed at a midway of the exhaust passage, and reformed fuel, in other words, reformed gas is introduced into the cylinder through the reformed gas inlet pipe. This may make it difficult to introduce the entirety of reformed gas into the cylinder. For instance, a part of reformed gas may flow into another path (an exhaust passage on the downstream side of the reforming chamber) other than the introduction path to the cylinder, or unreformed fuel may adhere and remain in the exhaust passage or on an inner wall of the reforming chamber. When the aforementioned condition occurs, only a part of reformed gas is used for combustion. This may offset the effect by reforming fuel, and may make it difficult to obtain a sufficient effect of improving fuel economy.

SUMMARY OF INVENTION

In view of the above, an object of the present invention is to provide a direct injection engine and a control method thereof, which enable to improve fuel economy of the engine by using reformed fuel without waste.

A direct injection engine according to an aspect of the present invention includes a cylinder configured to accommodate a piston to be reciprocally movable; a fuel injection valve configured to inject fuel containing gasoline into the cylinder; a water injection valve configured to inject water into the cylinder; an intake valve configured to open and close an intake port for introducing air into the cylinder; an exhaust valve configured to open and close an exhaust port for discharging combusted gas from the cylinder; a valve variable mechanism configured to change an operation timing of each of the intake valve and the exhaust valve; a fuel injection control module configured to control the fuel injection valve; a water injection control module configured to control the water injection valve; a valve control module configured to control the valve variable mechanism; and a calculation module configured to perform various calculations based on an operating condition of the engine. During an operation in a low load range where a load of the engine is lower than a predetermined load, the valve control module controls the valve variable mechanism in such a manner that a negative overlap period when both of the intake valve and the exhaust valve are closed across an exhaust top dead center is formed. During the operation in the low load range, the calculation module determines, as an injection timing of fuel by the fuel injection valve and an injection timing of water by the water injection valve, an injection timing when a steam reforming reaction occurs within the cylinder during the negative overlap period, the steam reforming reaction being such that at least a part of injected fuel and injected water turns to hydrogen and carbon monoxide. During the operation in the low load range, the fuel injection control module and the water injection control module respectively control to inject fuel from the fuel injection valve and control to inject water from the water injection valve at a timing within the negative overlap period determined by the calculation module.

Further, a control method according to another aspect of the present invention is applied to a direct injection engine provided with a cylinder configured to accommodate a piston to be reciprocally movable, a fuel injection valve configured to inject fuel containing gasoline into the cylinder, a water injection valve configured to inject water into the cylinder, an intake valve configured to open and close an intake port for introducing air into the cylinder, an exhaust valve configured to open and close an exhaust port for discharging combusted gas from the cylinder, and a valve variable mechanism configured to change an operation timing of each of the intake valve and the exhaust valve. The control method includes, during an operation in a low load range where a load of the engine is lower than a predetermined load, controlling the valve variable mechanism in such a manner that a negative overlap period when both of the intake valve and the exhaust valve are closed across an exhaust top dead center is formed; determining, as an injection timing of fuel by the fuel injection valve and an injection timing of water by the water injection valve, an injection timing when a steam reforming reaction occurs within the cylinder during the negative overlap period, the steam reforming reaction being such that at least a part of injected fuel and injected water turns to hydrogen and carbon monoxide; and controlling to inject fuel from the fuel injection valve and to inject water from the water injection valve respectively at a timing within the negative overlap period determined by the determination.

These and other objects, features and advantages of the present invention will become more apparent upon reading the following detailed description along with the accompanying drawings.

DESCRIPTION OF EMBODIMENTS

(1) Overall Configuration of Engine

Figure 1:
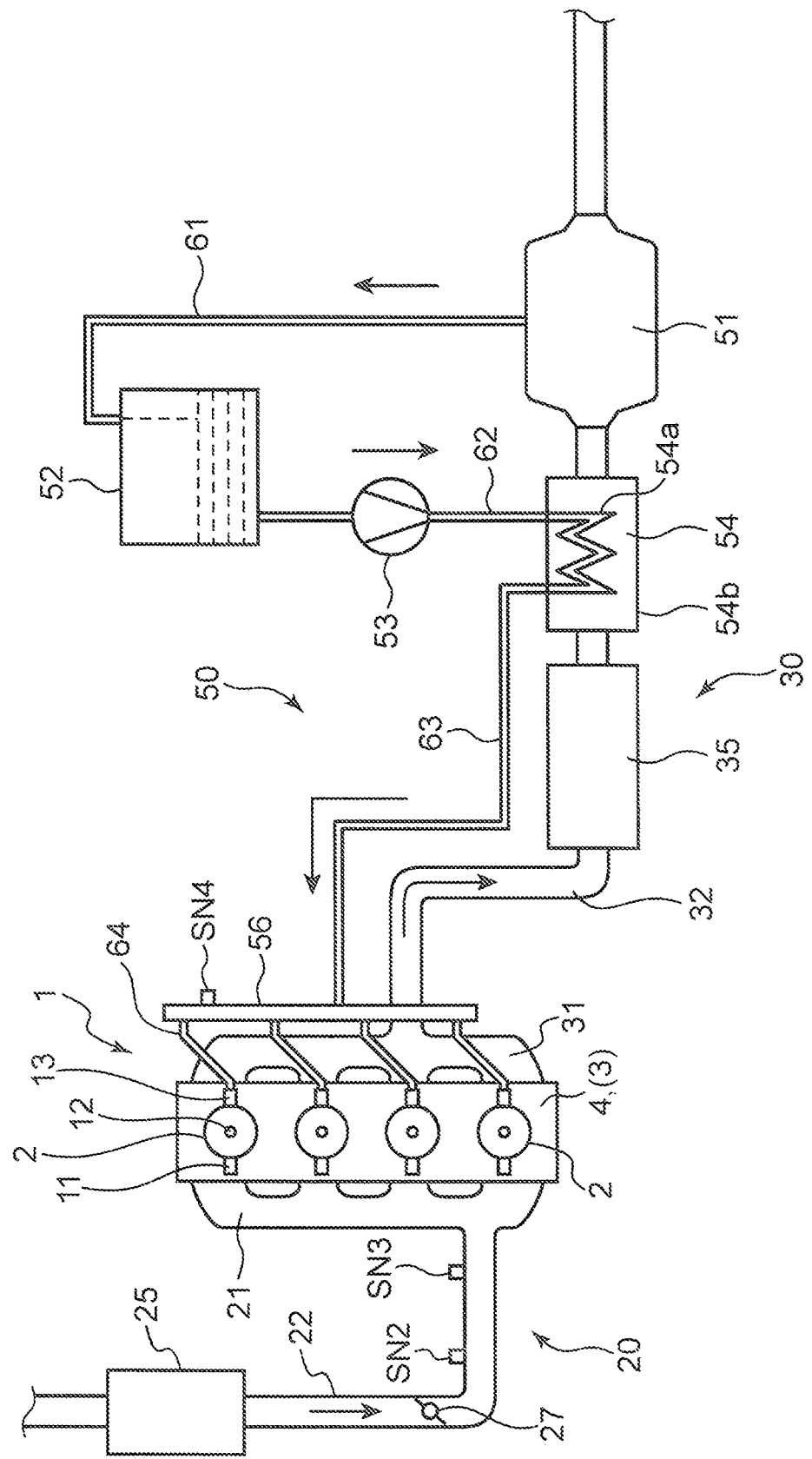
FIG. 1 is a diagram illustrating an overall configuration of a direct injection engine according to an embodiment of the present invention.
Figure 2:
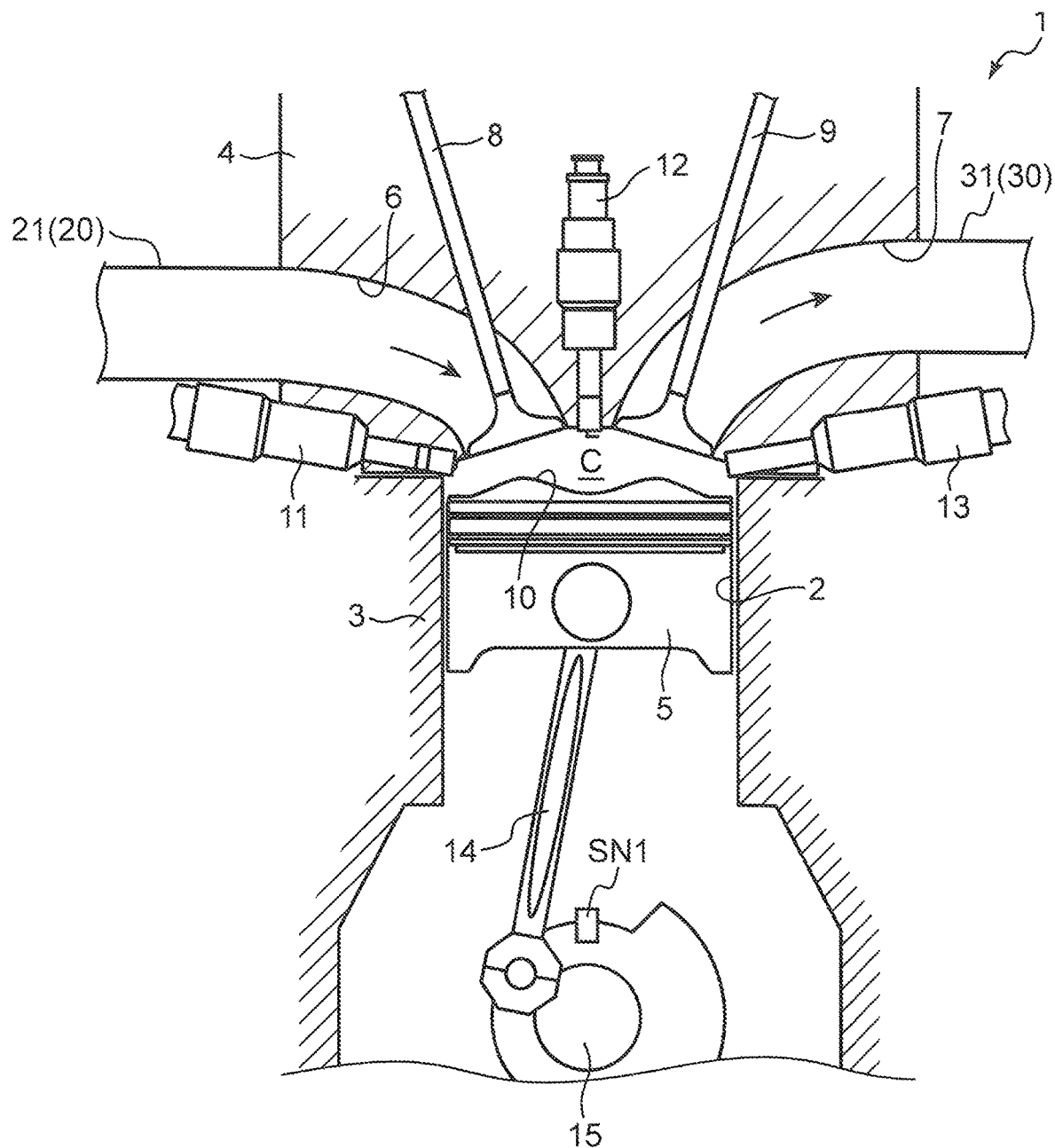
FIG. 2 is a sectional view of an engine body.

FIG. 1 and FIG. 2 are diagrams illustrating a direct injection engine according to an embodiment of the present invention. The engine illustrated in FIG. 1 and FIG. 2 is a 4-cycle gasoline engine mounted in a vehicle as a power source for traveling. The engine includes an in-line multi-cylinder engine body 1 having four cylinders 2 arranged in a row, an intake passage 20 for passing intake air to be introduced to the engine body 1, an exhaust passage 30 for passing exhaust gas discharged from the engine body 1, and a water supply device 50 for supplying water extracted from exhaust gas passing through the exhaust passage 30 to each cylinder 2 of the engine body 1.

As illustrated in FIG. 2, the engine body 1 includes a cylinder block 3 in which the cylinders 2 are formed, a cylinder head 4 mounted on a top surface of the cylinder block 3 in such a manner as to cover the cylinders 2 from above, and a piston 5 accommodated in each cylinder 2 to be reciprocally movable.

A combustion chamber C is defined above the piston 5. In the combustion chamber C, gasoline injected from a fuel injection valve 11 to be described later is supplied as fuel. Further, supplied fuel (gasoline) is combusted in the combustion chamber C, and the piston 5 that is pushed down by an expansion force by the combustion is reciprocally moved up and down.

A crankshaft 15 as an output shaft of the engine body 1 is disposed below the piston 5. The crankshaft 15 is connected to the piston 5 via a connecting rod 14, and is rotated around a central axis thereof as the piston 5 reciprocates. A crank angle sensor SN1 for detecting a rotational angle (a crank angle) of the crankshaft 15 is disposed in the cylinder block 3. Note that the crank angle sensor SN1 also serves as a sensor for detecting a rotational speed of the crankshaft 15, in other words, an output rotational speed of the engine body 1.

A cavity 10 recessed downwardly on the side opposite to the cylinder head 4 is formed in a center portion of a crown surface (a top surface) of the piston 5. The cavity 10 is formed to have a volume that occupies a large part of the combustion chamber C when the piston 5 is lifted to the top dead center.

In the cylinder head 4, a fuel injection valve 11 configured to inject fuel (gasoline) supplied from an unillustrated fuel pump into the combustion chamber C is disposed for each cylinder 2 (four fuel injection valves 11 in total). Each fuel injection valve 11 is disposed to inject fuel from laterally on the intake side into the combustion chamber C.

Further, in the cylinder head 4, a water injection valve 13 configured to inject water supplied from the water supply device 50 into the combustion chamber C is disposed for each cylinder 2 (four water injection valves 13 in total). Each water injection valve 13 is disposed to inject water from laterally on the exhaust side into the combustion chamber C. In other words, the water injection valve 13 is disposed to face the fuel injection valve 11 with respect to the central axis of the cylinder 2.

Further, in the cylinder head 4, a spark plug 12 configured to discharge spark to the combustion chamber C is disposed for each cylinder 2 (four spark plugs 12 in total). Each spark plug 12 has an electrode exposed to the combustion chamber C in the vicinity of the central axis of the cylinder 2. Each spark plug 12 forcibly ignites fuel injected from the fuel injection valve 11 by supplying spark generated on the electrode as ignition energy.

When spark is discharged from an electrode of the spark plug 12, a flame kernel is formed near the electrode, and a combustion area gradually spreads from the flame kernel outwardly (flame propagation). Note that in the embodiment, not all the fuel injected into the combustion chamber C is combusted by flame propagation, and at least a part of fuel is combusted by self-ignition. As described above, in the embodiment, so-called SPCCI (Spark Controlled Compression Ignition) combustion such that a flame kernel formed by spark ignition (forcible ignition) causes fuel around the flame kernel to be self-ignited is performed in all the operating ranges of the engine.

In order to perform SPCCI combustion as described above, it is necessary to secure a sufficiently high temperature by compression with the piston 5, as an internal temperature of the cylinder 2 (hereinafter, referred to as a cylinder temperature) immediately before spark ignition. In view of the above, in the embodiment, a geometric compression ratio of each cylinder 2, in other words, a ratio between a volume of the combustion chamber C when the piston 5 is at the top dead center, and a volume of the combustion chamber C when the piston 5 is at the bottom dead center is set to be not smaller than 16 but not larger than 30.

As illustrated in FIG. 2, in the cylinder head 4, an intake port 6 for introducing air supplied from the intake passage 20 into the combustion chamber C, an exhaust port 7 for discharging combusted gas (exhaust gas) generated in the combustion chamber C into the exhaust passage 30, an intake valve 8 for opening and closing an opening of the intake port 6 on the side of the combustion chamber C, and an exhaust valve 9 for opening and closing an opening of the exhaust port 7 on the side of the combustion chamber C are provided for each cylinder 2.

The intake valve 8 and the exhaust valve 9 are driven to open and close in association with rotation of the crankshaft 15 by an unillustrated valve drive device.

Figure 3:
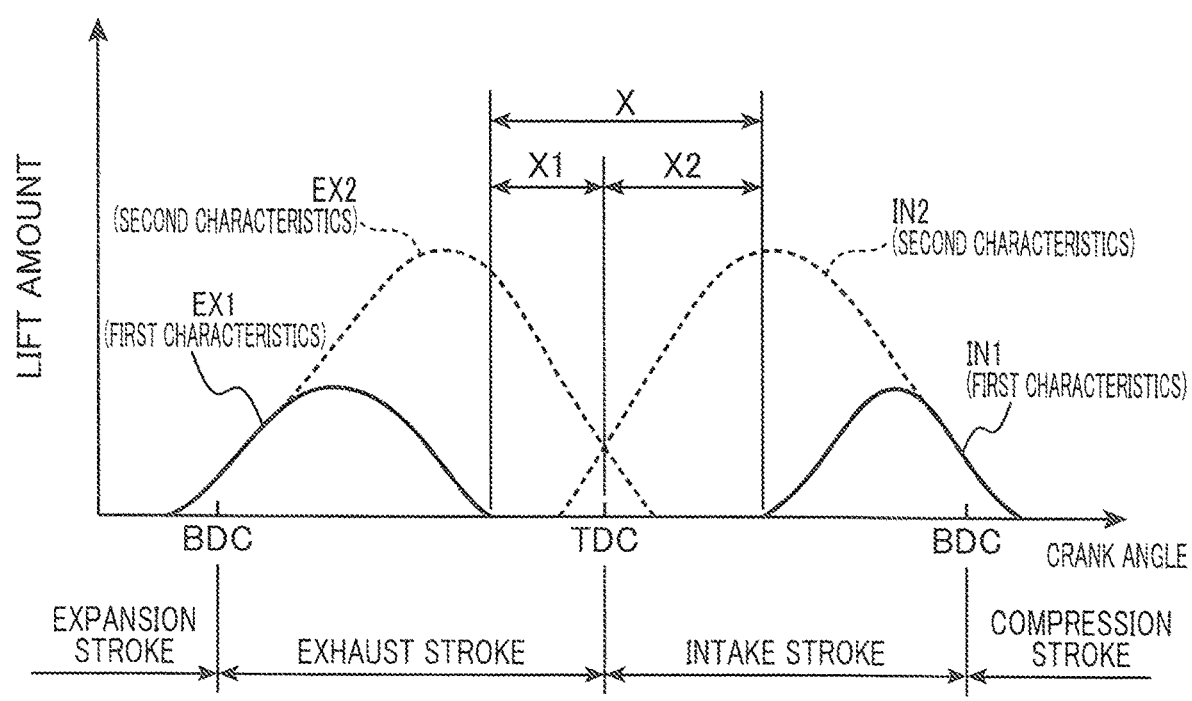
FIG. 3 is a diagram illustrating an example of setting lift characteristics of an intake valve and an exhaust valve.

A valve drive device for the intake valve 8 internally includes, as a type of a valve variable mechanism, a switching mechanism 18 (see FIG. 4) for switching lift characteristics of the intake valve 8 between two stages. Although detailed description is omitted, the switching mechanism 18 includes two types of cams whose profiles are different from each other, and a shift driving unit for shifting one of the two cams to press the intake valve 8. Further, causing the shift driving unit to switch the cam for pressing the intake valve 8 makes it possible to switch lift characteristics of the intake valve 8 between first characteristics indicated by a solid-line waveform IN1 in FIG. 3, and second characteristics indicated by a broken-line waveform IN2 in FIG. 3. The second characteristics IN2 are such that the lift amount is large, and the valve opening period is long, as compared with the first characteristics IN1. When the second characteristics IN2 are selected, the intake valve 8 is driven in such a manner that the valve opening period overlaps the entire period of an intake stroke, in other words, the intake valve 8 is opened earlier than the exhaust top dead center (TDC) and is closed later than the intake bottom dead center (the right-side BDC). On the other hand, when the first characteristics IN1 are selected, the intake valve 8 is driven in such a manner that the intake valve 8 is opened later than the exhaust top dead center (during an intake stroke), and is closed later than the intake bottom dead center. In other words, the first characteristics IN1 of the intake valve 8 are set such that the valve opening timing is shifted to the retard side (accordingly, the peak of a lift amount is shifted to the retard side) while keeping the valve closing timing substantially unchanged with respect to the second characteristics IN2.

Likewise, a valve drive device for the exhaust valve 9 internally includes, as a type of a valve variable mechanism, a switching mechanism 19 (see FIG. 4) for switching opening and closing characteristics of the exhaust valve 9 between two stages. The switching mechanism 19 has the same structure as the switching mechanism 18 for an intake valve. Switching a cam for pressing the exhaust valve 9 between two types of cams makes it possible to switch lift characteristics of the exhaust valve 9 between first characteristics indicated by a solid-line waveform EX1 in FIG. 3, and second characteristics indicated by a broken-line waveform EX2 in FIG. 3. The second characteristics EX2 are such that the lift amount is large and the valve opening period is long, as compared with the first characteristics EX1. When the second characteristics EX2 are selected, the exhaust valve 9 is driven in such a manner that the valve opening period overlaps the entire period of an exhaust stroke, in other words, the exhaust valve 9 is opened earlier than the expansion bottom dead center (the left-side BDC) and is closed later than the exhaust top dead center (TDC). On the other hand, when the first characteristics EX1 are selected, the exhaust valve 9 is driven in such a manner that the exhaust valve 9 is opened earlier than the expansion bottom dead center, and is closed earlier than the exhaust top dead center (during an exhaust stroke). In other words, the first characteristics EX1 of the exhaust valve 9 are set to characteristics such that the valve closing timing is shifted to the advance side (accordingly, the peak of a lift amount is shifted to the advance side) while keeping the valve opening timing substantially unchanged with respect to the second characteristics EX2.

Note that in the specification, an opening timing and a closing timing of the intake valve 8/the exhaust valve 9 are respectively an opening timing and a closing timing in a case where a portion other than ramp portions formed at the beginning and the end of a valve lift curve (buffer zones where a change in the valve lift amount is moderate) is defined as a valve opening period. The opening timing and the closing timing do not indicate a timing when the lift amount is completely zero. In the embodiment, a point of time when the valve lift amount is increased from 0 mm to 0.4 mm is an opening timing, and a point of time when the valve lift amount is decreased to 0.4 mm thereafter is a valve closing timing.

When lift characteristics of the intake valve 8 and lift characteristics of the exhaust valve 9 are respectively set to the first characteristics IN1 and the first characteristics EX1, both of the intake valve 8 and the exhaust valve 9 are kept in a closed state during a predetermined period from a certain point in an exhaust stroke to a certain point in an intake stroke. In other words, a negative overlap period X when both of the intake valve 8 and the exhaust valve 9 are closed across the exhaust top dead center is formed. When the negative overlap period X as described above is formed, a part of combusted gas generated by combustion in an immediately preceding expansion stroke is not discharged from the cylinder 2 and remains within the cylinder 2. In other words, internal EGR such that a part of combusted gas is allowed to remain within the cylinder 2 so as to bring the inside of the cylinder 2 to a high temperature state is performed.

When it is assumed that a part of the negative overlap period X corresponding to a crank angle range from a closing timing of the exhaust valve 9 to the exhaust top dead center is a former part X1, and a part of the negative overlap period X corresponding to a crank angle range from the exhaust top dead center to an opening timing of the intake valve 8 is a latter part X2, in the embodiment, lift characteristics of the intake valve 8 and the exhaust valve 9 (the first characteristics IN1 and the first characteristics EX1) are set in such a manner that the latter part X2 is longer than the former part X1.

As illustrated in FIG. 1, the intake passage 20 includes a common intake pipe 22 as a single pipe, and an intake manifold 21 formed to be branched from a downstream end of the common intake pipe 22. Each branch pipe of the intake manifold 21 is connected to the engine body 1 (the cylinder head 4) in such a manner as to communicate with each cylinder 2 via the intake port 6. A downstream end of the common intake pipe 22 is connected to a gathering portion of branch pipes of the intake manifold 21 (a portion where upstream ends of branch pipes gather). Note that in the specification, upstream (or downstream) of the intake passage 20 indicates upstream (or downstream) in the flow direction of intake air flowing through the intake passage 20.

An air cleaner 25 for removing foreign matter contained in intake air, and a throttle valve 27 operable to open and close so as to adjust the flow rate of intake air flowing through the common intake pipe 22 are disposed on the common intake pipe 22 in this order from the upstream side. Further, an airflow sensor SN2 for detecting a flow rate of intake air flowing through the common intake pipe 22, and an intake temperature sensor SN3 for detecting a temperature of intake air are disposed on the downstream side of the common intake pipe 22 with respect to the throttle valve 27.

The exhaust passage 30 includes a common exhaust pipe 32 as a single pipe, and an exhaust manifold 31 formed to be branched from an upstream end of the common exhaust pipe 32. Each branch pipe of the exhaust manifold 31 is connected to the engine body 1 (the cylinder head 4) in such a manner as to communicate with each cylinder 2 via the exhaust port 7. An upstream end of the common exhaust pipe 32 is connected to a gathering portion of branch pipes of the exhaust manifold 31 (a portion where downstream ends of branch pipes gather). Note that in the specification, upstream (or downstream) of the exhaust passage 30 indicates upstream (or downstream) in the flow direction of exhaust gas flowing through the exhaust passage 30.

A catalyst device 35, a heat exchanger 54, and a condenser 51 are disposed in this order from the upstream side on the common exhaust pipe 32.

The catalyst device 35 is configured to purify harmful components contained in exhaust gas. The catalyst device 35 internally includes one of a three-way catalyst, an oxidation catalyst, and an NOx catalyst, or any combination thereof. The catalyst device 35 may include a filter for trapping PM contained in exhaust gas, in addition to the aforementioned catalyst.

The condenser 51 is configured to condense steam contained in exhaust gas. The heat exchanger 54 is configured to heat condensed water generated in the condenser 51. The condenser 51 and the heat exchanger 54 are elements constituting a part of the water supply device 50, which will be described later in detail.

(2) Specific Configuration of Water Supply Device

As illustrated in FIG. 1, the water supply device 50 includes the condenser 51, the heat exchanger 54, a water tank 52 for storing condensed water generated in the condenser 51, a water feeding pump 53 for pumping out condensed water stored in the water tank 52 toward the heat exchanger 54, an accumulator rail 56 for storing high-temperature and high-pressure water which is pressurized by the water feeding pump 53 and heated by the heat exchanger 54 while keeping the water temperature and the water pressure, a first water pipe 61 for connecting between the condenser 51 and the water tank 52, a second water pipe 62 for connecting between the water tank 52 and the heat exchanger 54, a third water pipe 63 for connecting between the heat exchanger 54 and the accumulator rail 56, and a plurality of (four) distribution pipes 64 for connecting between the accumulator rail 56 and the water injection valve 13 of each cylinder 2.

The condenser 51 is a heat exchanger for condensing steam contained in exhaust gas flowing through the common exhaust pipe 32. The condenser 51 condenses steam contained in exhaust gas by cooling the exhaust gas by heat exchange with a predetermined coolant (e.g. engine cooling water). Condensed water generated in the condenser 51 flows downstream through the first water pipe 61, and is stored in the water tank 52.

The water feeding pump 53 is disposed at a midway of the second water pipe 62, and is configured to feed condensed water stored in the water tank 52 toward the heat exchanger 54, while pressurizing the condensed water.

The heat exchanger 54 is configured to heat water supplied from the water feeding pump 53 by heat exchange with exhaust gas before the exhaust gas flows into the condenser 51. Although detailed illustration is omitted, the heat exchanger 54 includes a small-diameter and long-shaped thin pipe 54a, which is inserted in a portion of the common exhaust pipe 32 at a position between the catalyst device 35 and the condenser 51, and an insulation case 54b formed to cover the portion of the common exhaust pipe 32 where the thin pipe 54a is inserted.

Water heated by the heat exchanger 54 is fed downstream through the third water pipe 63, and is stored in the accumulator rail 56. A water pressure sensor SN4 for detecting a pressure of water inside the accumulator rail 56 is disposed on the accumulator rail 56.

The temperature and the pressure of water stored in the accumulator rail 56 are increased to 200° C. or higher and to 10 MPa or higher through heating by the heat exchanger 54 and pressurization by the water feeding pump 53 as described above. Since the pressure of water stored in the accumulator rail 56 is as high as 10 MPa or higher, water does not boil even if being heated to 200° C. or higher, and is kept in a liquid state. Further, water stored in the accumulator rail 56 in the aforementioned state is injected into the cylinder 2 through the water injection valve 13 as necessary. Specifically, in the embodiment, water injected into the cylinder 2 from the water injection valve 13 is high-temperature and high-pressure liquefied water of a temperature of 200° C. or higher and a pressure of 10 MPa or higher.

(3) Control System of Engine

Figure 4:
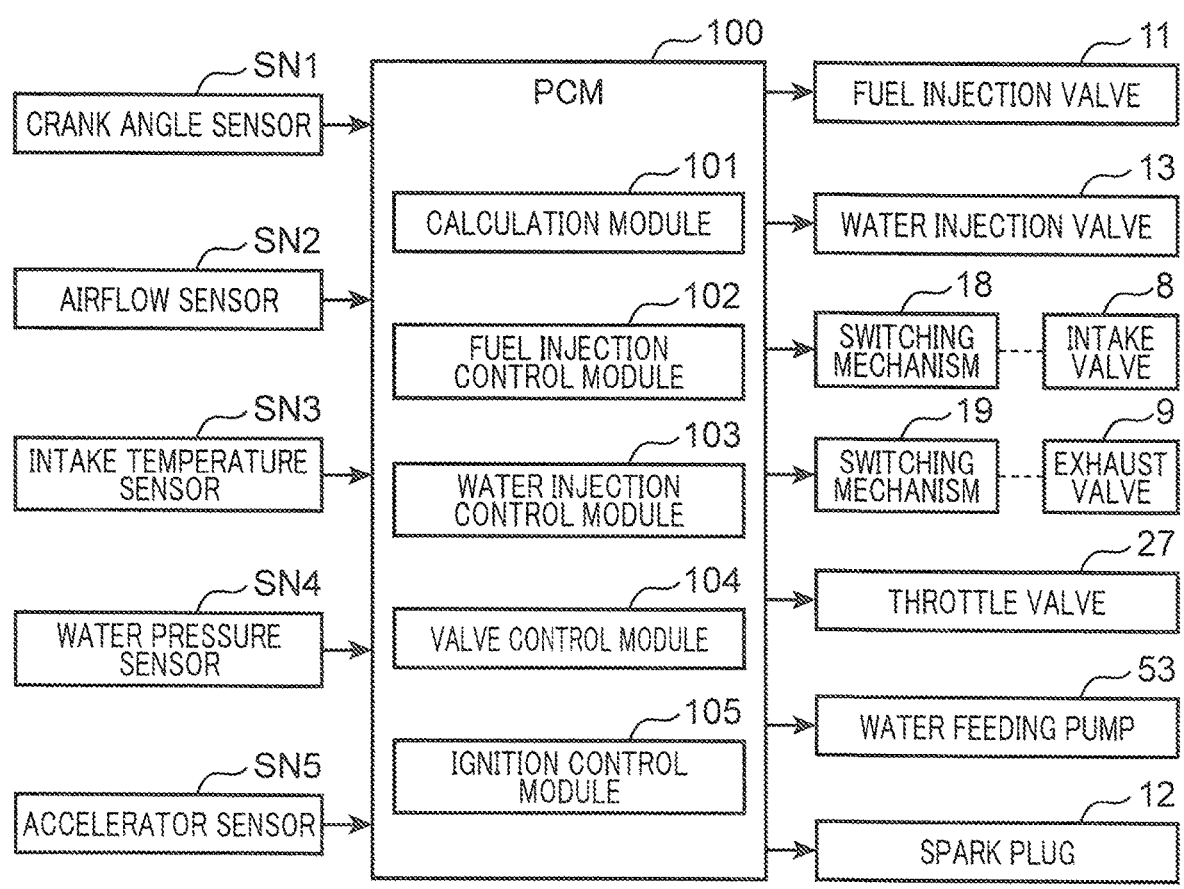
FIG. 4 is a block diagram illustrating a control system of the engine.

FIG. 4 is a block diagram illustrating a control system of the engine. A PCM 100 illustrated in FIG. 4 is a microprocessor for integrally controlling the engine, and is constituted by a well-known CPU, ROM, RAM, and the like.

Detection signals by various sensors are input to the PCM 100. For instance, the PCM 100 is electrically connected to the crank angle sensor SN1, the airflow sensor SN2, the intake temperature sensor SN3, and the water pressure sensor SN4. Information (i.e. a crank angle, an intake flow rate, an intake temperature, a water pressure, etc.) detected by these sensors is successively input to the PCM 100 as an electrical signal.

Further, a vehicle includes an accelerator sensor SN5 for detecting an opening angle of an accelerator pedal (not illustrated) to be operated by a driver driving the vehicle. A detection signal by the accelerator sensor SN5 is also input to the PCM 100.

The PCM 100 controls the units of the engine while performing various determinations and calculations based on input signals from the various sensors. Specifically, the PCM 100 is electrically connected to the fuel injection valves 11, the water injection valves 13, the switching mechanisms 18 and 19 for the intake valves 8 and the exhaust valves 9, the throttle valve 27, the water feeding pump 53, the spark plugs 12, and the like. The PCM 100 outputs signals for respectively controlling these devices based on a result of the calculation or the like.

As functional elements relating to the aforementioned control, the PCM 100 includes a calculation module 101, a fuel injection control module 102, a water injection control module 103, a valve control module 104, and an ignition control module 105.

The calculation module 101 performs various calculations based on an operating condition of the engine to be specified from detection values of the sensors SN1 to SN5. The fuel injection control module 102 controls the fuel injection valve 11, based on a calculation result by the calculation module 101. The water injection control module 103 controls the water injection valve 13 and the water supply device 50 (the water feeding pump 53) based on a calculation result by the calculation module 101. The valve control module 104 controls the switching mechanisms 18 and 19 based on a calculation result by the calculation module 101. The ignition control module 105 controls the spark plug 12 based on a calculation result by the calculation module 101.

More specifically, the calculation module 101 determines an injection amount and an injection timing of fuel by the fuel injection valve 11, based on an engine load to be specified from detection values (an intake flow rate and an accelerator opening angle) of the airflow sensor SN2 and the accelerator sensor SN5, and based on an engine speed detected by the crank angle sensor SN1. The fuel injection control module 102 controls the fuel injection valve 11 in accordance with the determination by the calculation module 101.

Further, the calculation module 101 determines an injection amount and an injection timing of water by the water injection valve 13, based on the engine load and the engine speed, and based on an intake temperature detected by the intake temperature sensor SN3. The water injection control module 103 controls the water injection valve 13 in accordance with the determination by the calculation module 101. In addition to the above, the water injection control module 103 drives the water feeding pump 53 in such a manner that an inner pressure of the accumulator rail 56 (a pressure of water stored in the accumulator rail 56) is retained to a required pressure (10 MPa) or higher, based on the inner pressure of the accumulator rail 56 detected by the water pressure sensor SN4.

Further, the calculation module 101 determines which one of a state such that lift characteristics of the intake valve 8 and lift characteristics of the exhaust valve 9 are respectively the first characteristics IN1 and the first characteristics EX1, and a state such that lift characteristics of the intake valve 8 and lift characteristics of the exhaust valve 9 are respectively the second characteristics IN2 and the second characteristics EX2 is to be selected, based on the engine load, the engine speed, and the like. The valve control module 104 controls the switching mechanisms 18 and 19 in accordance with the determination by the calculation module 101.

Further, the calculation module 101 determines a timing (an ignition timing) when spark is discharged from the spark plug 12 based on the engine load, the engine speed, and the like. The ignition control module 105 controls the spark plug 12 in accordance with the determination by the calculation module 101.

(4) Control Depending on Operating Condition

Next, control of the fuel injection valve 11, the switching mechanisms 18 and 19, and the water injection valve 13 by the PCM 100 is described in detail.

Figure 5:
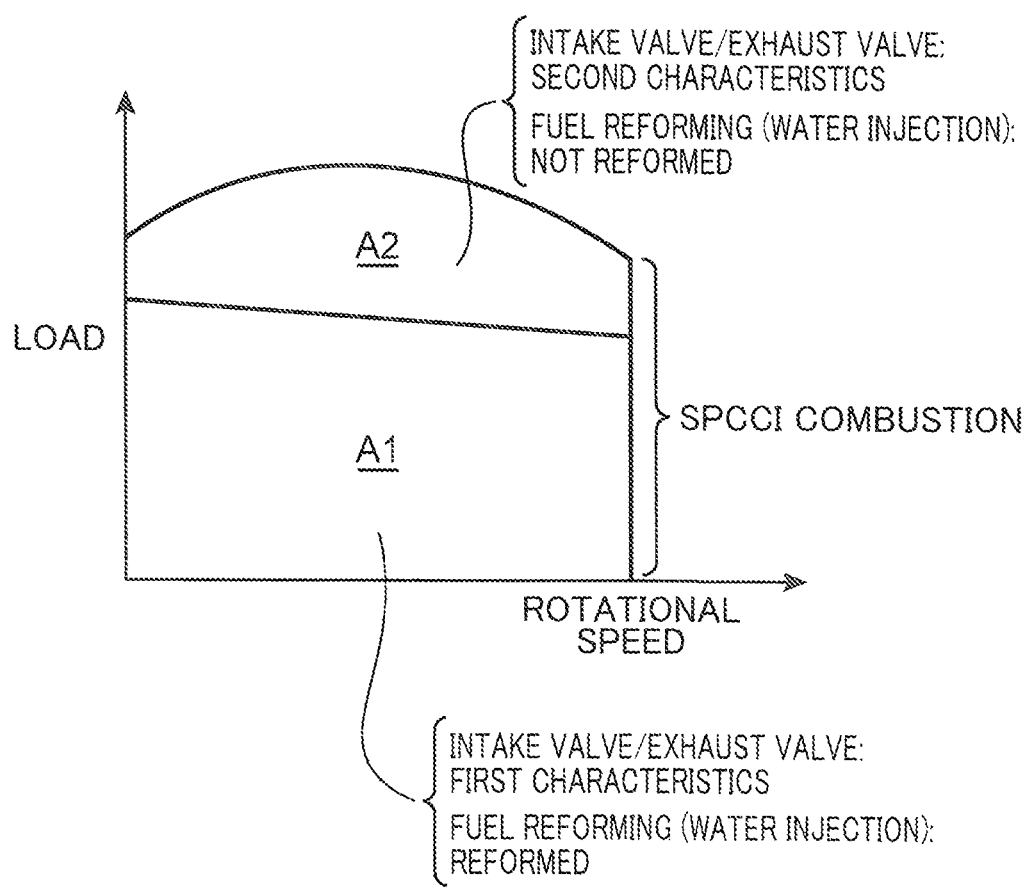
FIG. 5 is a map diagram illustrating differences in control depending on an operating condition of the engine.

FIG. 5 is a map diagram for describing differences in control depending on an operating condition of the engine (an engine load/an engine speed). As described above, in the embodiment, SPCCI combustion such that an air-fuel mixture is ignited by the spark plug 12 to cause self-ignition of the air-fuel mixture around a spark point is performed in all the operating ranges of the engine. In the embodiment, SPCCI combustion of different modes is performed in a first operating range A1 including a low load range of the engine, and in a second operating range A2 where the load is higher than that in the first operating range A1. Specifically, in the first operating range A1 on the low load side, SPCCI combustion such that fuel is self-ignited after the fuel is reformed is performed, and in the second operating range A2 on the high load side, SPCCI combustion such that fuel is self-ignited without a reforming process is performed. Therefore, the presence or absence of water injection by the water injection valve 13, valve characteristics of the intake valve 8 and the exhaust valve 9, and a fuel injection timing by the fuel injection valve 11 differ from each other between the first operating range A1 and the second operating range A2.

(i) Control in First Operating Range

Figure 6:
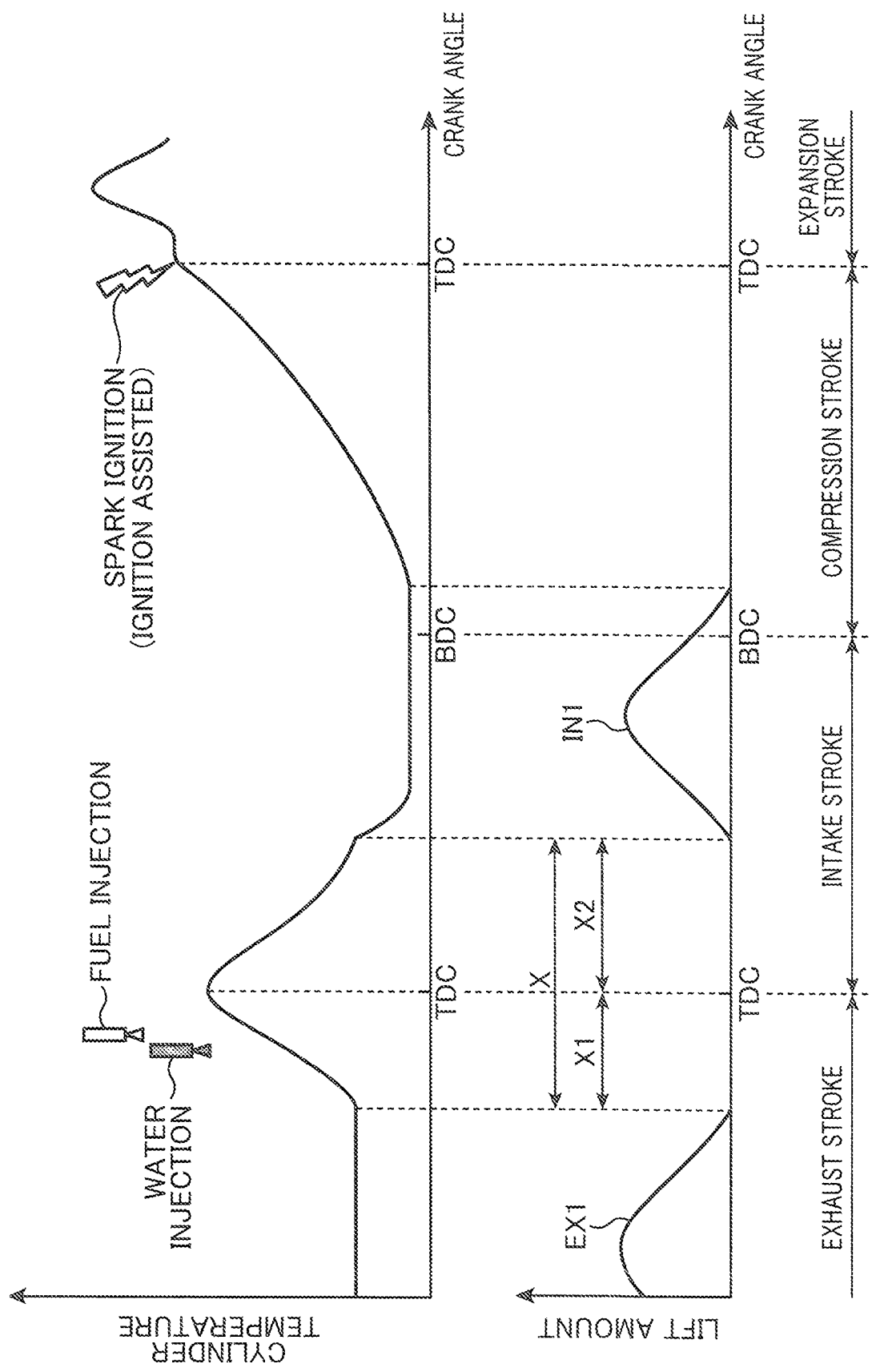
FIG. 6 is a time chart for describing contents of control to be performed in a low to middle load range (a first operating range) of the engine.

FIG. 6 is a time chart for describing contents of control to be performed in the first operating range A1 on the low load side. As illustrated in FIG. 6, in the first operating range A1, the switching mechanisms 18 and 19 are controlled in such a manner that lift characteristics of the intake valve 8 and lift characteristics of the exhaust valve 9 respectively become the first characteristics IN1 and the first characteristics EX1, and the negative overlap period X is formed in a period including the exhaust top dead center (the left-side TDC). Further, during the negative overlap period X, water is injected from the water injection valve 13, and fuel is injected from the fuel injection valve 11. Further, spark is discharged from the spark plug 12 in the vicinity of the compression top dead center (the right-side TDC).

Specifically, water injection by the water injection valve 13 is performed within the former part X1 of the negative overlap period X, which is a period from a closing timing of the exhaust valve 9 to the exhaust top dead center, specifically, is performed at a point of time within the former part X1 when the cylinder temperature is increased to a temperature included in a temperature range where a low temperature oxidation reaction of fuel occurs, or to a temperature exceeding the temperature range. Specifically, in the former part X1 of the negative overlap period X, the piston 5 is lifted in a state that both of the intake valve 8 and the exhaust valve 9 are closed. Therefore, gas (mainly, combusted gas) within the cylinder 2 is compressed accompanied by lifting of the piston 5. Then, the cylinder temperature is increased to a temperature included in a temperature range where a low temperature oxidation reaction of fuel occurs, or to a temperature exceeding the temperature range at a point of time before the piston 5 reaches the exhaust top dead center. Note that the low temperature oxidation reaction is a slow oxidation reaction, which occurs at a stage before a high temperature oxidation reaction i.e. a reaction such that fuel vigorously oxidizes (a reaction accompanying flame generation) occurs, and is a reaction that occurs in a temperature range of about not lower than 500° C. but not higher than 650° C. In the following, a temperature range (about 500 to 650° C.) where the aforementioned low temperature oxidation reaction occurs is referred to as a low temperature oxidation reaction range.

In order to perform water injection at the aforementioned timing, the calculation module 101 determines, by calculation, a specific crank angle at which the cylinder temperature is increased to a predetermined temperature (e.g. a temperature within a range of from 500 to 750° C.), which is included in the low temperature oxidation reaction range or to a temperature exceeding the low temperature oxidation reaction range, based on an engine load/an engine speed, an intake temperature, and the like at each point of time to be specified by the crank angle sensor SN1, the airflow sensor SN2, the accelerator sensor SN5, and the intake temperature sensor SN3. Thereafter, the water injection control module 103 controls to inject water of a predetermined amount from the water injection valve 13 at a point of time when the specific crank angle determined by the calculation module 101 is reached.

Fuel injection by the fuel injection valve 11 is performed at a timing slightly later than water injection by the water injection valve 13. Specifically, the calculation module 101 determines, as a timing of fuel injection by the fuel injection valve 11, a specific crank angle at which the timing is later than the timing of water injection by the water injection valve 13 and is earlier than the exhaust top dead center. Thereafter, the fuel injection control module 102 controls to inject fuel from the fuel injection valve 11 at a point of time when the specific crank angle determined by the calculation module 101 is reached. Further, the amount of fuel to be injected in this case is determined based on an engine load/an engine speed, and is determined in such a manner that the higher the engine load is, the more the injection amount is at a same engine speed, for instance.

A part of fuel and water injected into the cylinder 2 as described above reacts in a high temperature environment during a negative overlap period, and turns to hydrogen and carbon monoxide. This reaction is referred to as a so-called steam reforming reaction such that fuel (gasoline) is reformed by using water. The reaction is represented by the following formula (1). Note that the formula (1) indicates a reforming reaction of isooctane ($C_8H_{18}$), which is a representative component of gasoline.

$$C_8H_{18} + 8H_2O \rightarrow 8CO + 17H_2 + 11 \text{ MJ/kg} \qquad (1)$$

where "+11 MJ/kg" on the right side indicates that heat of 11 MJ is absorbed each time reaction of 1 kg progresses. In other words, this reaction is an endothermic reaction.

The aforementioned steam reforming reaction is likely to progress, as the maximum value of a cylinder temperature during the negative overlap period X increases, and is likely to progress, as a period when the cylinder temperature exceeds the low temperature oxidation reaction range increases after fuel injection. In view of the above, when it is assumed that a ratio of fuel that turns to hydrogen ($H_2$) and carbon monoxide (CO) with respect to injected fuel (gasoline) is a fuel reforming rate, it is possible to adjust the fuel reforming rate by changing the injection timing of fuel. For instance, in a condition where the maximum value of a cylinder temperature during the negative overlap period X is the same, the earlier the fuel injection timing is, the higher the fuel reforming rate is, and the later the fuel injection timing is, the lower the fuel reforming rate is. In other words, even in a case where the maximum value of a cylinder temperature differs due to a difference in the engine load or the like, it is possible to make the fuel reforming rate substantially equal by adjusting the fuel injection timing. Specifically, in a case where the maximum value of a cylinder pressure is high, it is possible to make the fuel reforming rate substantially equal by retarding the fuel injection timing, as compared with a case where the maximum value of a cylinder pressure is low.

In the embodiment, the fuel injection timing is adjusted in such a manner that the aforementioned fuel reforming rate is substantially not lower than 40% but not higher than 60%. This is because the aforementioned range is appropriate for obtaining characteristics of fuel suitable for SPCCI combustion, which will be described later in detail. Setting the fuel reforming rate from 40% to 60% allows reformed fuel to be a mixture in which hydrogen ($H_2$), carbon monoxide (CO), and gasoline ($C_8H_{18}$) are mixed.

Fuel (a mixture of gasoline, hydrogen, and carbon monoxide) that is reformed during the negative overlap period X as described above is mixed with air to be introduced into the cylinder 2 accompanied by opening of the intake valve 8, which is performed following the reforming operation. Then, when the time of compression stroke has come and the intake valve 8 is closed, gas within the cylinder 2 (a mixture of reformed fuel, air, and combusted gas) substantially starts to be compressed from the point of time when the intake valve 8 is closed, and the inside of the cylinder 2 is brought to a high-temperature and high-pressure state until immediately before fuel is self-ignitable in the vicinity of the compression top dead center (the right-side TDC). In other words, in the embodiment, an effective compression ratio of each cylinder 2, in other words, a ratio between the volume of the combustion chamber C when the piston 5 is at the top dead center, and the volume of the combustion chamber C at a point of time when the intake valve 8 is closed is set to a value at which the inside of the cylinder 2 is brought to a high-temperature and high-pressure state until immediately before fuel is self-ignitable (until a state that fuel is easily self-ignited by spark ignition).

At a point of time when the inside of the cylinder 2 is brought to a high-temperature and high-pressure state as described above, spark ignition by the spark plug 12 is performed. For instance, the calculation module 101 determines, as an ignition timing by the spark plug 12, a specific crank angle at which a target fuel ignition timing is obtainable, based on a map or the like in which the target fuel ignition timing is determined in advance for each operating condition (an engine load/an engine speed). Thereafter, the ignition control module 105 energizes the spark plug 12 to discharge spark from an electrode of the spark plug 12 at a point of time when the specific crank angle determined by the calculation module 101 is reached.

FIG. 6 exemplifies a case in which spark ignition is performed substantially simultaneously with the compression top dead center. A flame kernel is formed in the vicinity of an electrode of the spark plug 12 by forcible ignition due to spark ignition, and the inside of the cylinder 2 is further brought to a high-temperature and high-pressure state by formation of the flame kernel. Then, fuel in a state immediately before self-ignition at a point of time when spark ignition occurs is self-ignited around the flame kernel in a multiple simultaneous manner, triggered by formation of the flame kernel. Specifically, SPCCI combustion such that fuel is self-ignited and combusted, triggered by spark ignition (formation of a flame kernel) is performed.

In the example illustrated in FIG. 6, the ignition timing is set to a timing substantially coincident with the compression top dead center. Alternatively, the ignition timing may be set to a timing shifted to the advance side from the compression top dead center, or may be set to a timing shifted to the retard side from the compression top dead center depending on an operating condition of the engine (an engine load/an engine speed). In any of the cases, the ignition timing is set to be included in one of a latter stage of a compression stroke, and an initial stage of an expansion stroke. Note that in the specification, a latter stage of a compression stroke is a range from 60° CA before the compression top dead center (BTDC) until the compression top dead center, and an initial stage of an expansion stroke is a range from the compression top dead center to 60° CA after the compression top dead center (ATDC). Specifically, in the embodiment, the spark plug 12 is controlled in such a manner that the ignition timing is included in a latter stage of a compression stroke or in an initial stage of an expansion stroke (BTDC 60° CA to ATDC 60° CA).

(ii) Control in Second Operating Range

In the second operating range A2 where the load is higher than that in the first operating range A1, ordinary SPCCI combustion that does not accompany a fuel reforming process is performed. Specifically, in the second operating range A2, the switching mechanisms 18 and 19 are controlled in such a manner that lift characteristics of the intake valve 8 and lift characteristics of the exhaust valve 9 respectively are the second characteristics IN2 and the second characteristics EX2 (see FIG. 3). This is performed in order to of the negative overlap period X, and to introduce a large amount of air (fresh air) sufficient for a high load state into the cylinder 2. Further, for instance, fuel is injected from the fuel injection valve 11 during a period from a closing timing of the intake valve 8 to the compression top dead center (in other words, during a compression stroke), and spark ignition by the spark plug 12 is performed after the fuel injection. Then, SPCCI combustion such that a flame kernel is formed by forcible ignition due to spark ignition, and fuel around the flame kernel is self-ignited is performed. Note that in the second operating range A2, it is not necessary to perform a fuel reforming process by a steam reforming reaction. Therefore, it is needless to say that water injection by the water injection valve 13 is stopped.

(5) Advantageous Effects

As described above, in the engine of the embodiment, the intake valve 8 and the exhaust valve 9 are controlled in such a manner that the negative overlap period X when both of the intake valve 8 and the exhaust valve 9 are closed across the exhaust top dead center during an operation in the first operating range A1 where the load is relatively low. Further, fuel and water are respectively injected from the fuel injection valve 11 and the water injection valve 13 during the negative overlap period X, and a part of injected fuel reacts with water within the cylinder 2, and is converted to hydrogen and carbon monoxide (a steam reforming reaction). The aforementioned configuration makes it possible to use reformed fuel without waste, and is advantageous in improving fuel economy of the engine.

Figure 7:
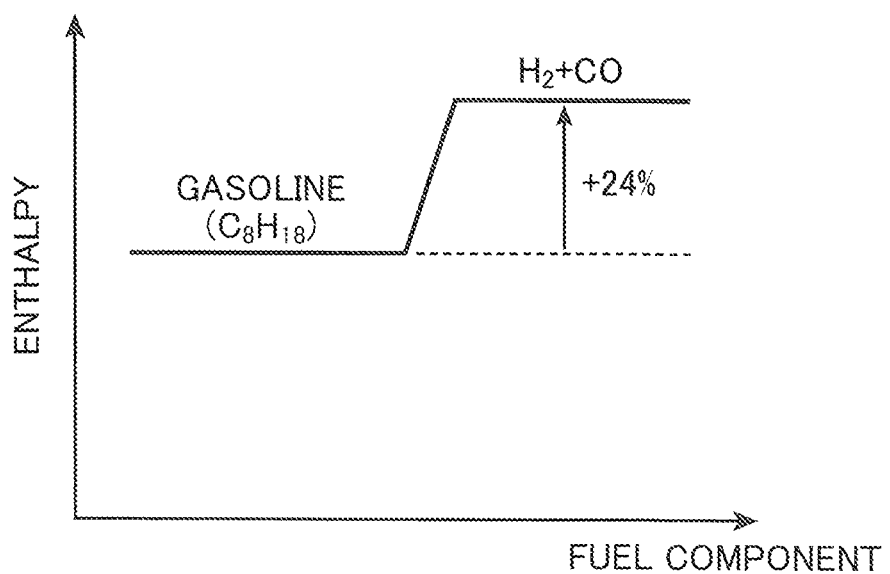
FIG. 7 is a graph for describing that enthalpy (a calorific value) increases by reforming fuel.

Specifically, in the embodiment, the negative overlap period X when both of the intake valve 8 and the exhaust valve 9 are closed across the exhaust top dead center is formed, whereby internal EGR such that combusted gas is allowed to remain within the cylinder 2 is performed. Further, the remaining combusted gas (internal EGR gas) is compressed by lifting of the piston 5 during the negative overlap period X, and the inside of the cylinder 2 is brought to a high-temperature and high-pressure state. Further, injecting fuel and water into the cylinder 2 in a high-temperature and high-pressure state allows a part of injected fuel to react with water while absorbing heat from around the fuel, whereby the part of fuel is converted to hydrogen and carbon monoxide (a steam reforming reaction). Note that hydrogen and carbon monoxide have high enthalpy, as compared with fuel (gasoline) before reforming. For instance, as illustrated in FIG. 7, when it is assumed that the whole amount of isooctane ($C_8H_{18}$), which is a representative component of gasoline, is converted to hydrogen and carbon monoxide ($H_2$+CO), reformed fuel has enthalpy higher than the enthalpy of isooctane before reforming by 24%. When reformed fuel as described above is combusted in an expansion stroke, a larger amount of heat is generated accompanied by the combustion. Therefore, as compared with a case where fuel is not reformed, work (expansion work) of pushing down the piston 5 increases. This means that a part of heat (waste heat), which is supposed to be discharged from the cylinder 2, is extracted as work, in other words, waste heat recovery is carried out. Specifically, it is possible to improve the indicated efficiency i.e. a ratio at which energy supplied as fuel is converted to work, by the waste heat recovery. In addition to the above, fuel is reformed within the cylinder 2. Therefore, for instance, unlike a case where fuel is reformed on the outside of the cylinder 2, and the reformed fuel is introduced into the cylinder 2, it is possible to combust basically the whole amount of reformed fuel within the cylinder 2, and to efficiently extract work by using the combustion energy. Furthermore, heat is absorbed accompanied by progress of a reforming reaction. Therefore, it is possible to suppress an increase in the cylinder temperature during the negative overlap period X, and to reduce cooling loss of the engine. As described above, in the embodiment, it is possible to improve the indicated efficiency by waste heat recovery, and to reduce cooling loss. This is advantageous in improving fuel economy of the engine.

Further, in the embodiment, fuel is injected from the fuel injection valve 11 at a timing slightly later than water injection from the water injection valve 13. This makes it possible to supply a sufficient amount of water into the cylinder 2 before a fuel reforming reaction starts, and to promote the fuel reforming reaction.

Further, in the embodiment, after the negative overlap period X starts, water is injected from the water injection valve 13 at a point of time when the cylinder temperature is increased to a temperature included in the low temperature oxidation reaction range (a temperature range where a low temperature oxidation reaction of fuel occurs), or to a temperature exceeding the temperature range. Therefore, for instance, unlike a case where water is injected in an initial stage of the negative overlap period X, it is possible to suppress that an increase in the cylinder temperature is obstructed by water injection, and to efficiently increase the cylinder temperature. Specifically, in an initial stage of the negative overlap period X, the piston 5 is lifted at a relatively high speed within the cylinder 2 in a sealed state. Therefore, the cylinder temperature is rapidly increased accompanied by lifting (compression) of the piston 5. However, when it is assumed that water injection is performed in a period when the cylinder temperature is likely to increase as described above, a temperature increase may be obstructed by absorption of latent heat by injected water, and the cylinder temperature may not be increased to a sufficiently high level. On the other hand, in the embodiment, water is injected at a point of time when the cylinder temperature is increased to a sufficiently high temperature in the low temperature oxidation reaction range or to a temperature exceeding the low temperature oxidation reaction range. This makes it possible to efficiently increase the cylinder temperature in an initial stage of the negative overlap period X, and to realize a cylinder environment where the inside of the cylinder is brought to a high-temperature and high-pressure state necessary for reforming fuel with a high probability.

Further, in the embodiment, the latter part X2 (a crank angle range from the exhaust top dead center to an opening timing of the intake valve 8) of the negative overlap period X is set longer than the former part X1 (a crank angle range from the closing timing of the exhaust valve 9 to the exhaust top dead center) of the negative overlap period X. This is advantageous in preventing backflow of gas containing fuel within the cylinder 2 to the intake port 6 accompanied by opening of the intake valve 8. Specifically, in the embodiment, fuel and water are injected during the negative overlap period X. In other words, the amount of gas within the cylinder 2 is increased during the negative overlap period X. When it is assumed that the former part X1 and the latter part X2 of the negative overlap period X are set equal to each other, the cylinder pressure is high at the end of the negative overlap period X (at an opening timing of the intake valve 8), as compared with the start of the negative overlap period X (at a closing timing of the exhaust valve 9). This may cause a phenomenon such that gas within the cylinder 2 flows back to the intake port 6 immediately after the intake valve 8 is opened. This may lead to reduction of the amount of fuel existing in the cylinder 2. On the other hand, in the embodiment, in which the latter part X2 is set longer than the former part X1 of the negative overlap period X, it is possible to prevent a phenomenon such that gas flows back to the intake port 6 as described above. This makes it possible to secure fuel of an intended amount within the cylinder 2, and to generate a sufficient output torque.

Further, in the embodiment, water heated and pressurized by the water supply device 50 is supplied to the water injection valve 13 so as to inject water of a temperature of 200° C. or higher and a pressure of 10 MPa or higher from the water injection valve 13. This makes it possible to appropriately supply water of a required amount into the cylinder 2, while suppressing lowering of the cylinder temperature. Specifically, water is injected from the water injection valve 13 at a pressure of 10 MPa or higher. This makes it possible to inject water, without hindrance, from the water injection valve 13 into the cylinder 2, which is brought to a pressurized state during the negative overlap period X. Further, water to be injected from the water injection valve 13 is high-temperature water of 200° C. or higher. This makes it possible to suppress lowering of the cylinder temperature accompanied by the water injection, and to prevent obstruction of a fuel reforming reaction by temperature lowering.

Further, in the embodiment, the geometric compression ratio of each cylinder 2 is set to be not smaller than 16 but not larger than 30. Therefore, it is possible to secure a stroke amount (a compression amount) of a piston during a period from a closing timing of the exhaust valve 9 to the exhaust top dead center, and to sufficiently increase the cylinder temperature during the negative overlap period X without excessively increasing the negative overlap period X. This makes it possible to securely reform fuel within the cylinder 2 in a high-temperature state during the negative overlap period X, while avoiding an excessive reduction of the amount of intake air to be introduced into the cylinder 2.

Further, in the embodiment, SPCCI combustion such that a flame kernel is formed within a cylinder by forcible ignition due to spark ignition, and fuel around the flame kernel is self-ignited is performed in the first operating range A1 where control for reforming fuel (water injection and fuel injection during the negative overlap period X) is performed. Therefore, it is possible to perform combustion with enhanced thermal efficiency and with high controllability by using characteristics of reformed fuel containing hydrogen and carbon monoxide. Specifically, hydrogen contained in reformed fuel has characteristics such that the flame propagation speed is high, as compared with fuel (gasoline) before reforming. Therefore, performing spark ignition with respect to reformed fuel containing hydrogen having the aforementioned characteristics makes it possible to speedily and securely form a flame kernel. When a flame kernel is formed, fuel around the flame kernel is self-ignited in a multiple simultaneous manner by a high-temperature and high-pressure treatment within the cylinder 2 accompanied by formation of the flame kernel. This makes it possible to complete combustion in a short period, and to perform combustion with less exhaust loss and with enhanced thermal efficiency. In addition to the above, it is possible to control the timing when fuel is self-ignited by spark ignition. This makes it easy to obtain an intended combustion pattern for each operating condition, and to enhance combustion controllability.

In particular, in the embodiment, the fuel reforming rate i.e. a ratio of fuel that turns to hydrogen and carbon monoxide with respect to injected fuel (gasoline) is set to be not lower than 40% but not higher than 60%. Therefore, it is possible to prevent a situation such that fuel is accidentally self-ignited before spark ignition, and to enhance fuel controllability.

Figure 8:
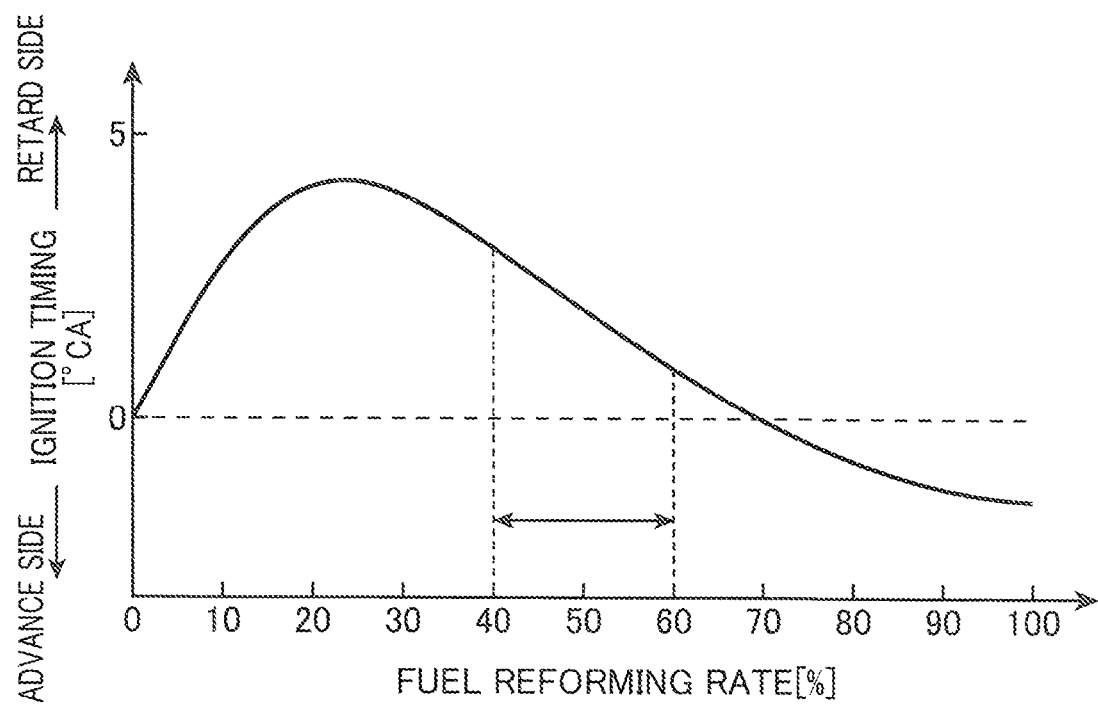
FIG. 8 is a graph for describing that a timing of self-ignition changes depending on a fuel reforming rate.

FIG. 8 is a graph illustrating a relationship between an ignition timing and a fuel reforming rate in a case where fuel is self-ignited without being assisted by spark ignition (i.e. only by compression). It is clear from the graph of FIG. 8 that an ignition timing is retarded in a case where fuel is reformed, in other words, reformed fuel has characteristics such that fuel is less likely to be self-ignited in a range where the reforming rate is lower than about 70%. More specifically, an ignition timing is retarded as the reforming rate is gradually increased from 0%, and a most retarded ignition timing is obtained when the reforming rate reaches about 20%. Thereafter, a retard width of the ignition timing is gradually decreased, as the reforming rate is increased. When the reforming rate reaches about 70%, the ignition timing is the same as the ignition timing of fuel before reforming (in other words, the fuel reforming rate=0%). Further, in a case where the reforming rate is larger than 70%, the ignition timing is advanced, as compared with a case of fuel before reforming.

In the embodiment, in which fuel having the aforementioned relationship between a reforming rate and an ignition timing is used, in a case where the reforming rate is set from 40% to 60%, reformed fuel has characteristics such that fuel is less likely to be self-ignited, as compared with fuel before reforming. According to this configuration, it is possible to avoid a situation such that fuel may be self-ignited before spark ignition, while setting an effective compression ratio of the engine to a relatively high value; and to perform combustion with high controllability such that the timing of self-ignition is adjustable by spark ignition. Further, about a half amount of fuel is converted to hydrogen and carbon monoxide having high enthalpy. This makes it possible to enhance the efficiency of waste heat recovery, and is advantageous in improving fuel economy.

(6) Modifications

In the embodiment, high-temperature water of a temperature of 200° C. or higher is injected at a pressure of 10 MPa or higher from the water injection valve 13. Water to be injected from a water injection valve may have a temperature at least higher than the temperature of engine cooling water in a warm state. Further, an injection pressure of water may be a pressure at which water is injectable into a cylinder (a cylinder in a high-pressure state by compression) during a negative overlap period. In view of these points, the temperature of water to be injected from a water injection valve may be 100° C. or higher, and the injection pressure of water may be 5 MPa or higher.

Further, in the embodiment, water is injected from the water injection valve 13 at a point of time, within the negative overlap period X, when the cylinder temperature is increased to a temperature (e.g. a temperature from 500 to 750° C.), which is included in the low temperature oxidation reaction range, or to a temperature exceeding the low temperature oxidation reaction range. The water injection timing, however, is not limited to the above. Water may be injected before the cylinder temperature reaches the low temperature oxidation reaction range (in other words, at a point of time before the cylinder temperature reaches 500° C.). Further, in the embodiment, fuel is injected from the fuel injection valve 11 at a timing later than water injection from the water injection valve 13. The fuel injection timing, however, is not limited to the above. Fuel may be injected simultaneously with water injection. Alternatively, fuel may be injected before water injection. In any of the cases, it is possible to change each of the water injection timing and the fuel injection timing to an appropriate timing, as far as both of water and fuel are injected during a negative overlap period, and a reforming reaction such that at least a part of injected fuel (gasoline) turns to hydrogen and carbon monoxide occurs.

Further, in the embodiment, there is described an example, in which the present invention is applied to a gasoline engine, in which SPCCI combustion such that a flame kernel is formed within a cylinder by forcible ignition due to spark ignition, and fuel around the flame kernel is self-ignited is performed in all the operating ranges of the engine. The engine to which the present invention is applicable, however, is not limited to the aforementioned engine. For instance, the present invention is applicable to a gasoline engine, in which HCCI combustion such that fuel is self-ignited without being assisted by spark ignition is performed, a gasoline engine, in which SI combustion such that fuel is combusted only by flame propagation after spark ignition is performed, and a gasoline engine, in which the combustion mode is switched between two or more combustion modes out of SPCCI combustion, HCCI combustion, and SI combustion depending on an operating condition of the engine.

Further, in the embodiment, there is described an example, in which the present invention is applied to an engine, in which gasoline is used as fuel. The engine to which the present invention is applicable, however, may be an engine, in which fuel containing ethanol as a sub component is used in addition to gasoline, as far as the engine uses fuel containing gasoline as a main component.

(7) Summary

The following is a summary of the embodiment and the modifications thereof.

A direct injection engine includes a cylinder configured to accommodate a piston to be reciprocally movable; a fuel injection valve configured to inject fuel containing gasoline into the cylinder; a water injection valve configured to inject water into the cylinder; an intake valve configured to open and close an intake port for introducing air into the cylinder; an exhaust valve configured to open and close an exhaust port for discharging combusted gas from the cylinder; a valve variable mechanism configured to change an operation timing of each of the intake valve and the exhaust valve; a fuel injection control module configured to control the fuel injection valve; a water injection control module configured to control the water injection valve; a valve control module configured to control the valve variable mechanism; and a calculation module configured to perform various calculations based on an operating condition of the engine. During an operation in a low load range where a load of the engine is lower than a predetermined load, the valve control module controls the valve variable mechanism in such a manner that a negative overlap period when both of the intake valve and the exhaust valve are closed across an exhaust top dead center is formed. During the operation in the low load range, the calculation module determines, as an injection timing of fuel by the fuel injection valve and an injection timing of water by the water injection valve, an injection timing when a steam reforming reaction occurs within the cylinder during the negative overlap period, the steam reforming reaction being such that at least a part of injected fuel and injected water turns to hydrogen and carbon monoxide. During the operation in the low load range, the fuel injection control module and the water injection control module respectively control to inject fuel from the fuel injection valve and control to inject water from the water injection valve at a timing within the negative overlap period determined by the calculation module.

According to the aforementioned configuration, the negative overlap period when both of the intake valve and the exhaust valve are closed across the exhaust top dead center is formed, whereby internal EGR such that combusted gas is allowed to remain within the cylinder is performed. Further, the remaining combusted gas (internal EGR gas) is compressed by lifting the piston during the negative overlap period to bring the inside of the cylinder to a high-temperature and high-pressure state. Further, by injecting fuel and water into the cylinder in a high-temperature and high-pressure state, a part of injected fuel reacts with water while absorbing heat from around the fuel, and is converted to hydrogen and carbon monoxide (a steam reforming reaction). Note that hydrogen and carbon monoxide have high enthalpy, as compared with fuel (gasoline) before reforming. When reformed fuel having high enthalpy as described above is combusted in an expansion stroke, a larger amount of heat is generated accompanied by the combustion. Therefore, as compared with a case where fuel is not reformed, work (expansion work) of pushing down the piston increases. This means that a part of heat (waste heat), which is supposed to be discharged from the cylinder, is extracted as work, in other words, waste heat recovery is carried out. Specifically, it is possible to improve the indicated efficiency i.e. a ratio at which energy supplied as fuel is converted to work, by the waste heat recovery. In addition to the above, fuel is reformed within the cylinder. Therefore, for instance, unlike a case where fuel is reformed on the outside of the cylinder, and the reformed fuel is introduced into the cylinder, it is possible to combust basically the whole amount of reformed fuel within the cylinder, and to efficiently extract work by using the combustion energy. Furthermore, heat is absorbed accompanied by progress of a reforming reaction. Therefore, it is possible to suppress an increase in the cylinder temperature during the negative overlap period, and to reduce cooling loss of the engine. As described above, in the present invention, it is possible to improve the indicated efficiency by waste heat recovery, and to reduce cooling loss. This is advantageous in improving fuel economy of the engine.

Preferably, during the operation in the low load range, the fuel injection control module may control to inject fuel from the fuel injection valve at a same time as water injection from the water injection valve or at a time later than water injection from the water injection valve.

According to the aforementioned configuration, it is possible to supply a sufficient amount of water into the cylinder before a fuel reforming reaction starts. This is advantageous in promoting the fuel reforming reaction.

In the aforementioned configuration, more preferably, during the operation in the low load range, the water injection control module may control to inject water from the water injection valve at a point of time when a temperature within the cylinder is increased to a temperature included in a temperature range where a low temperature oxidation reaction of fuel occurs, or to a temperature exceeding the temperature range. Specifically, the timing of water injection in this case may be a timing included in a former part of the negative overlap period and included in a period when a temperature within the cylinder is from 500 to 700° C., wherein the former part is a period from a closing timing of the exhaust valve to the exhaust top dead center.

As described above, in a case where water is injected after the cylinder temperature is increased to a temperature included in the temperature range (the low temperature oxidation reaction range) where the low temperature oxidation reaction of fuel occurs, or to a temperature exceeding the temperature range, for instance, unlike a case where water is injected in an initial stage of the negative overlap period, it is possible to suppress that an increase in the cylinder temperature may be obstructed by water injection, and to efficiently increase the cylinder temperature. Specifically, in an initial stage of the negative overlap period, the piston is lifted at a relatively high speed within the cylinder in a sealed state. Therefore, the cylinder temperature is rapidly increased accompanied by lifting (compression) of the piston. However, when it is assumed that water injection is performed in a period when the cylinder temperature is likely to increase as described above, a temperature increase may be obstructed by absorption of latent heat by injected water, and the cylinder temperature may not be increased to a sufficiently high level. On the other hand, in the aforementioned configuration, water is injected at a point of time when the cylinder temperature is increased to a sufficiently high temperature in the low temperature oxidation reaction range or to a temperature exceeding the low temperature oxidation reaction range. This makes it possible to efficiently increase the cylinder temperature in an initial stage of the negative overlap period, and to realize a cylinder environment where the inside of the cylinder is brought to a high-temperature and high-pressure state necessary for reforming fuel with a high probability.

Preferably, during the operation in the low load range, the valve control module may control to open and close the intake valve and the exhaust valve via the valve variable mechanism in such a manner that a crank angle range from the exhaust top dead center to an opening timing of the intake valve is larger than a crank angle range from a closing timing of the exhaust valve to the exhaust top dead center.

As described above, in a case where the latter part of the negative overlap period (the crank angle range from the exhaust top dead center to the opening timing of the intake valve) is set longer than the former part of the negative overlap period (the crank angle range from the closing timing of the exhaust valve to the exhaust top dead center), it is possible to efficiently prevent that gas containing fuel within the cylinder may flow back to an intake port accompanied by opening of the intake valve. Specifically, in the present invention, fuel and water are injected during the negative overlap period. In other words, the amount of gas within the cylinder is increased. When it is assumed that the former part and the latter part of the negative overlap period are set equal to each other, the cylinder pressure is high at the end of the negative overlap period (at the opening timing of the intake valve), as compared with the start of the negative overlap period (at the closing timing of the exhaust valve). This may cause a phenomenon such that gas within the cylinder flows back to the intake port immediately after the intake valve is opened. This may lead to reduction of the amount of fuel existing in the cylinder. On the other hand, in the aforementioned configuration, in which the latter part is set longer than the former part of the negative overlap period, it is possible to prevent a phenomenon such that gas may flow back to the intake port as described above. This makes it possible to secure fuel of an intended amount within the cylinder, and to generate a sufficient output torque.

Preferably, the direct injection engine may further include a water supply device configured to supply water to the water injection valve while heating and pressurizing the water. During the operation in the low load range, the water injection valve may be operative to inject water of a temperature of 100° C. or higher and a pressure of 5 MPa or higher supplied from the water supply device.

As described above, in a case where relatively high-temperature and high-pressure water is injected from the water injection valve, it is possible to inject water, without hindrance, into the cylinder in a high-pressure state during the negative overlap period. Further, it is possible to suppress lowering of the cylinder temperature accompanied by the water injection. This makes it possible to prevent obstruction of a fuel reforming reaction by temperature lowering.

A geometric compression ratio of the cylinder may be preferably set to be not smaller than 16 but not larger than 30.

According to the aforementioned configuration, it is possible to secure a stroke amount (a compression amount) of the piston during the period from the closing timing of the exhaust valve to the exhaust top dead center, without excessively increasing the negative overlap period, and to sufficiently increase the cylinder temperature during the negative overlap period. This makes it possible to securely reform fuel within the cylinder in a high-temperature state during the negative overlap period, while avoiding an excessive reduction of the amount of intake air to be introduced into the cylinder.

Preferably, the direct injection engine may further include a spark plug configured to discharge spark in a latter stage of a compression stroke or in an initial stage of an expansion stroke to ignite fuel within the cylinder. During the operation in the low load range, the valve control module may control to close the intake valve via the valve variable mechanism at a timing when an effective compression ratio capable of performing SPCCI combustion is achieved, the SPCCI combustion being such that after a flame kernel is formed within the cylinder by forcible ignition due to the spark ignition, fuel around the flame kernel is self-ignited.

According to the aforementioned configuration, it is possible to perform combustion with enhanced thermal efficiency and with high controllability by using characteristics of reformed fuel containing hydrogen and carbon monoxide. Specifically, hydrogen contained in reformed fuel has characteristics such that the flame propagation speed is high, as compared with fuel (gasoline) before reforming. Therefore, performing spark ignition with respect to reformed fuel containing hydrogen having the aforementioned characteristics makes it possible to speedily and securely form a flame kernel. When a flame kernel is formed, fuel around the flame kernel is self-ignited in a multiple simultaneous manner by a high-temperature and high-pressure treatment within the cylinder accompanied by formation of the flame kernel. This makes it possible to complete combustion in a short period, and to perform combustion with less exhaust loss and with enhanced thermal efficiency. In addition to the above, it is possible to control the timing when fuel is self-ignited by spark ignition. This makes it easy to obtain an intended combustion pattern for each operating condition, and to enhance combustion controllability.

As described above, in the engine in which SPCCI combustion is performed during the operation in the low load range, it is preferable to reform 40 to 60% of fuel injected into the cylinder. Specifically, preferably, during the operation in the low load range, the fuel injection control module may control to inject fuel from the fuel injection valve at a timing when a fuel reforming rate is from 40 to 60%, wherein the fuel reforming rate is a ratio of fuel that turns to hydrogen and carbon monoxide with respect to fuel injected within the cylinder.

This application is based on Japanese Patent Application No. 2016-172755 filed on Sep. 5, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A direct injection engine, comprising:
a cylinder configured to accommodate a piston to be reciprocally movable;
a fuel injection valve configured to inject fuel containing gasoline into the cylinder;
a water injection valve configured to inject water into the cylinder;
an intake valve configured to open and close an intake port for introducing air into the cylinder;
an exhaust valve configured to open and close an exhaust port for discharging combusted gas from the cylinder;
a valve variable mechanism configured to change an operation timing of each of the intake valve and the exhaust valve;
a fuel injection control module configured to control the fuel injection valve;
a water injection control module configured to control the water injection valve;
a valve control module configured to control the valve variable mechanism; and
a calculation module configured to perform various calculations based on an operating condition of the engine, wherein
during an operation in a low load range where a load of the engine is lower than a predetermined load, the valve control module controls the valve variable mechanism in such a manner that a negative overlap period when both of the intake valve and the exhaust valve are closed across an exhaust top dead center is formed,
during the operation in the low load range, the calculation module determines an injection timing of fuel by the fuel injection valve and an injection timing of water by the water injection valve to thereby cause injected fuel and injected water to undergo a steam reforming reaction within the cylinder during the negative overlap period, the steam reforming reaction being such that at least a part of injected fuel and injected water turns to hydrogen and carbon monoxide,
during the operation in the low load range, the fuel injection control module and the water injection control module respectively control to inject fuel from the fuel injection valve and control to inject water from the water injection valve at the timing within the negative overlap period determined by the calculation module and in an order such that the injection of fuel is later than the injection of water,
water injection starts and ends during a former part of the negative overlap period, the former part being a period from a timing when the exhaust valve is closed during an exhaust stroke to the exhaust top dead center, and
fuel injection starts at a time which is closer to the exhaust top dead center than the closing timing of the exhaust valve in the time period from the end of the water injection to the exhaust top dead center.

2. The direct injection engine according to claim 1, wherein
during the operation in the low load range, the water injection control module controls to inject water from the water injection valve at a point of time when a temperature within the cylinder is increased to a temperature at or above a temperature where a low temperature oxidation reaction of fuel occurs.

3. The direct injection engine according to claim 2, wherein
a geometric compression ratio of the cylinder is set to be not smaller than 16 but not larger than 30.

4. The direct injection engine according to claim 1, wherein
during the operation in the low load range, the valve control module controls to open and close the intake valve and the exhaust valve via the valve variable mechanism in such a manner that a crank angle range from the exhaust top dead center to an opening timing of the intake valve is larger than a crank angle range from a closing timing of the exhaust valve to the exhaust top dead center.

5. The direct injection engine according to claim 2, wherein
during the operation in the low load range, the valve control module controls to open and close the intake valve and the exhaust valve via the valve variable mechanism in such a manner that a crank angle range from the exhaust top dead center to an opening timing of the intake valve is larger than a crank angle range from a closing timing of the exhaust valve to the exhaust top dead center.

6. The direct injection engine according to claim 1, further comprising:
a water supply device configured to supply water to the water injection valve while heating and pressurizing the water, wherein
during the operation in the low load range, the water injection valve is operative to inject water of a temperature of 100° C. or higher and a pressure of 5 MPa or higher supplied from the water supply device.

7. The direct injection engine according to claim 2, further comprising:
a water supply device configured to supply water to the water injection valve while heating and pressurizing the water, wherein
during the operation in the low load range, the water injection valve is operative to inject water of a temperature of 100° C. or higher and a pressure of 5 MPa or higher supplied from the water supply device.

8. The direct injection engine according to claim 1, wherein
during the operation in the low load range, the water injection control module controls to inject water from the water injection valve at a timing included in a former part of the negative overlap period and included in a period when a temperature within the cylinder is from 500 to 700° C., the former part being a period from a closing timing of the exhaust valve to the exhaust top dead center.

9. A control method of a direct injection engine provided with a cylinder configured to accommodate a piston to be reciprocally movable, a fuel injection valve configured to inject fuel containing gasoline into the cylinder, a water injection valve configured to inject water into the cylinder, an intake valve configured to open and close an intake port for introducing air into the cylinder, an exhaust valve configured to open and close an exhaust port for discharging combusted gas from the cylinder, and a valve variable mechanism configured to change an operation timing of each of the intake valve and the exhaust valve, the control method comprising:

during an operation in a low load range where a load of the engine is lower than a predetermined load:

controlling the valve variable mechanism in such a manner that a negative overlap period when both of the intake valve and the exhaust valve are closed across an exhaust top dead center is formed;

determining an injection timing of fuel by the fuel injection valve and an injection timing of water by the water injection valve to thereby cause injected fuel and injected water to undergo a steam reforming reaction within the cylinder during the negative overlap period, the steam reforming reaction being such that at least a part of injected fuel and injected water turns to hydrogen and carbon monoxide; and controlling to inject fuel from the fuel injection valve and to inject water from the water injection valve respectively at the timing within the negative overlap period determined by the determination and in an order such that the injection of fuel is later than the injection of water, wherein water injection starts and ends during a former part of the negative overlap period, the former part being a period from a timing when the exhaust valve is closed during an exhaust stroke to the exhaust top dead center, and fuel injection starts at a time which is closer to the exhaust top dead center than the closing timing of the exhaust valve in the time period from the end of the water injection to the exhaust top dead center.

10. The control method of the direct injection engine according to claim 9, wherein during the operation in the low load range, water is injected from the water injection valve at a point of time when a temperature within the cylinder is increased to a temperature at or above a temperature where a low temperature oxidation reaction of fuel occurs.

* * * * *